Aug. 8, 1967  W. A. STUTSKE  3,334,987
FEEDER TUBE SUPPORT AND DRIVE FOR GLASS FURNACE
Filed Feb. 11, 1963  2 Sheets-Sheet 1

INVENTOR.
WILLIAM A. STUTSKE
BY
*W. A. Schaich &*
*E. J. Holler,*
ATTORNEYS.

Aug. 8, 1967 W. A. STUTSKE 3,334,987
FEEDER TUBE SUPPORT AND DRIVE FOR GLASS FURNACE
Filed Feb. 11, 1963 2 Sheets-Sheet 2
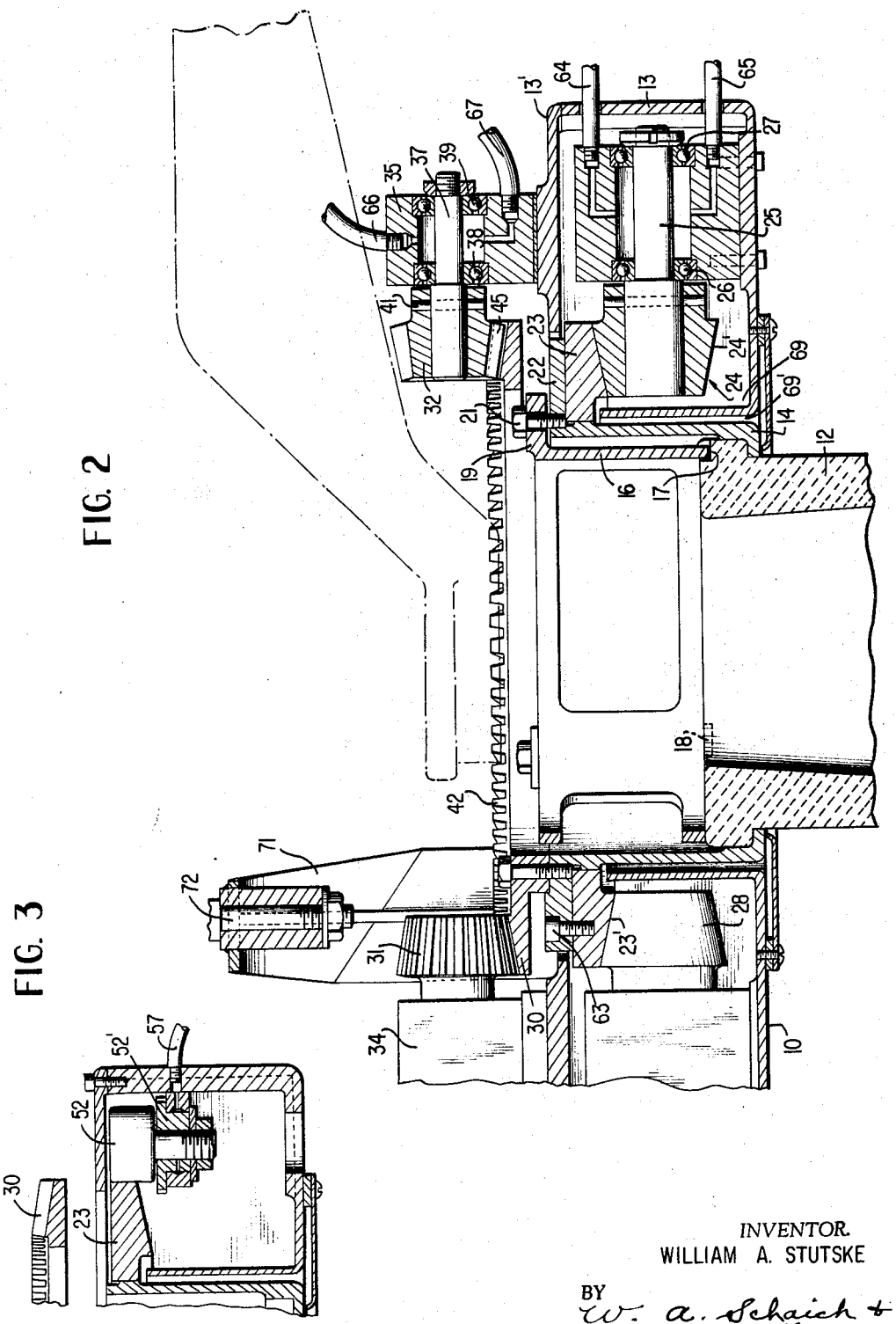
INVENTOR.
WILLIAM A. STUTSKE
BY W. A. Schaich &
E. J. Holler,
ATTORNEYS.

United States Patent Office 3,334,987
Patented Aug. 8, 1967

3,334,987
FEEDER TUBE SUPPORT AND DRIVE FOR GLASS FURNACE
William A. Stutske, Toledo, Ohio, assignor to Owens-Illinois, Inc., a corporation of Ohio
Filed Feb. 11, 1963, Ser. No. 257,728
6 Claims. (Cl. 65—324)

This invention relates generally to glass feeders associated with continuously operating furnaces and more particularly to improved support and centering mechanism for rotary feeder tubes employed in mixing and controlling molten glass as it is drawn from the feeder assembly.

For many purposes a glass feeder assembly includes a forehearth portion of the melting furnace into which glass is admitted from the main furnace in controlled amounts in a fluid condition but requiring constant mixing in order to prevent variations of temperature, even in small increments, within the feeder so that the glass drawn therefrom be entirely uniform in its drawing characteristics. Such a forehearth is normally supplied with an opening at the bottom for drawing off the desired portions of glass for the shape being formed. Surrounding this opening there is normally a feeder tube which performs the mixing function and which may perform the further function of controlling the rate at which glass is drawn from the forehearth through the opening which governs the shape or quantity of the glass being formed.

Such a mixing tube or feeder tube in the feeder assembly is normally supported at a point above the forehearth on ball bearings, or the like, and is driven by a chain and sprocket or similar arrangement which inevitably causes lateral displacement forces on the supporting bearings. These lateral forces and the forces which arise from the reaction to the stirring operation have in the past caused various difficulties including short life of the thrust bearings which are generally exposed to a corrosive atmosphere above the melt. Under the influence of these corrosive gases at high temperature precision ball bearings have been found to lose their required degree of precision, with the result that the rotary assembly is caused to vibrate and to rotate irregularly and to lose its control features at a date earlier than can readily be accepted in a commerical operation. Highly stressed components such as ball bearings tend to lose material after surface deterioration in the presence of the heated gases, which is more readily scoured off under high stress, and the result is a sluffing off of material which may enter the melt and thereby cause a poor quality of glass, or nonuniformities therein, of a type unacceptable for the production of television picture tubes and the like. One means of overcoming this difficulty in part is disclosed in the co-pending application filed by the inventor hereof and Donald G. Davey, entitled, Feeder Tube Centering and Drive, filed Feb. 11, 1963, Ser. No. 257,725. This co-pending application provides reduced stress and better centering but does not solve entirely the problems above noted, particularly with respect to the thrust bearing which is near the hot corrosive gases, which may still involve small stressed members in ball bearing structures normally associated with a thrust bearing as disclosed in the co-pending application. That structure is not fully protected from hot corrosive gases which may cause in part bearing deterioration and consequent glass contamination.

An object of this invention accordingly is to provide improved structure for accurate rotation of a feeder tube which will be more durable and less subject to contamination.

A further object of the invention is to provide accurate centering of a feeder tube support for rotation without the use of conventional thrust bearings.

Another object of the invention is to provide a structure in which a rotating feeder tube may be carried above a forehearth such that wear particles from moving parts are prevented from entering the melt.

A still further object of the invention is to provide a supporting structure for the control and rotation of a feeder tube in which all moving metal parts are protected from the heat and gases from the molten glass in the feeder assembly.

Other features and objects of the invention will be appreciated by reference to the specification and drawings in which:

FIG. 2 is a vertical section taken along line 2—2 of FIG. 1;

FIG. 3 is a section along the line 3—3 of FIG. 1; and

Figure 1:
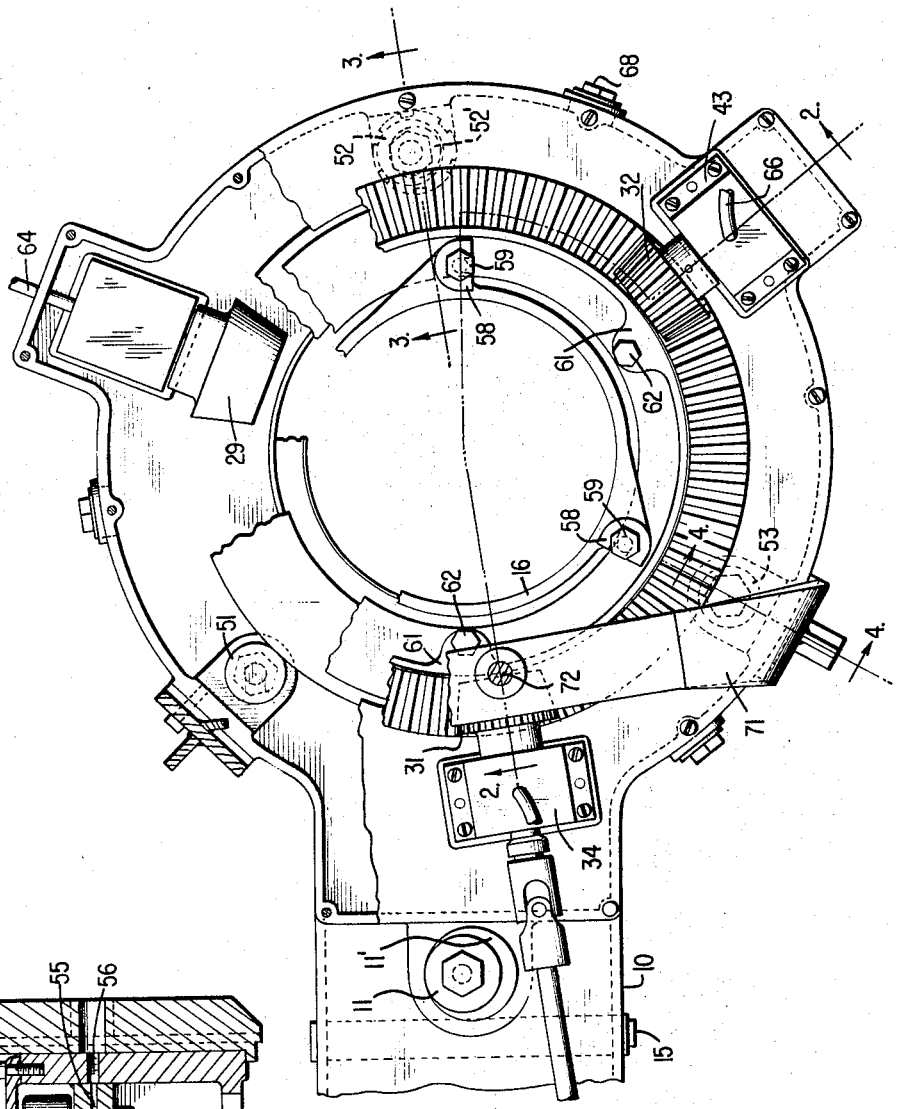
FIG. 1 is a partial plan view of a feeder assembly according to this invention, partly cut away.

FIG. 1 shows that portion of a feeder assembly to which the present invention applies. The general arrangement will be understood by those skilled in the art, particularly by reference to the before mentioned co-pending patent application, wherein a frame member 10 is generally supported for positioning about a vertical shaft 11 which may be extended to the left or right, as viewed in FIG. 1, by the operation of an eccentric arrangement about the shaft 11 cooperating with a suitable receptacle in frame 10. Furthermore, there is preferably supplied a transverse axis including a shaft 15 perpendicularly disposed with respect to the shaft 11 about which the frame 10 may pivot to provide an appropriate angle with respect to the horizontal direction. The generally elongated frame member 10 which is thus rotatable about shafts 11 and 15 has an extended portion 13 which is enlarged to receive the tube-supporting mechanism and has a central aperture through which mixing tube 12 may be entered and supported in a rotary assembly. Supporting the tube 12 at peripheral flanges thereon is a collar 14, which is preferably of cylindrical form inwardly turned at the lower edge to receive the flange of tube 12, and extends upwardly for engagement with the supporting and rotating mechanism to be described. Within the collar 14 and supported at the upper edge thereof is a clamp member 16, which is adapted to hold the tube 12 against the inwardly turned edge of the collar 14, and is caused to press downwardly thereagainst at a plurality of points such as 17 and 18. A slot may be formed in the flange edge of the tube 12 for engagement with keyed portions of the clamp member 16 as at 17 and 18, or the tube flange may be arranged to receive frame member 16 on a smooth horizontal surface as at 17 and 18, in which adequate pressure is exerted by clamping means comprising flange ears 19 engaging collar member 14 by means of adjusting and clamping screws 21.

Frame extension 13 is supplied with a cover member 13' serving as a support for the rotary mechanism and having a central aperture to receive a horizontal flange portion of the collar 14 as at 22 positioned for rotation within the aperture of member 13' as illustrated particularly in FIG. 2. A small clearance is provided for purposes of air circulation and centering the tube supporting mechanism within the apertured member 13'.

Failure of conventional thrust ball bearings and the resulting contamination of the glass beneath it is avoided by the invention in that an improved mechanism is substituted for the usual thrust bearing. Beveled ring 23 is arranged in supporting contact with flange 22 being secured thereto by bolts or other suitable means. Ring 23 is formed with circular aperture which comprises a cylinder closely engaging the exterior of the collar 14 and has an upper horizontal surface engaging the lower side of the flange 22. A bevel portion 23' has an inclination outwardly and upwardly to form a frustro-conical surface of slope related to the distance of the bevel face from the axis of the cylinder such that it may be supported on a plurality of conical rollers 24 having matching beveled faces 24' to permit free rotation of ring 23 about its central vertical axis without sliding friction on the rollers 24. It is most convenient to employ three or more rollers such as 24 arranged at equal intervals around the member 13' of which one roller underlies the position of the driving bevel gear later to be described, and each roller underlies one of the idler pinions. Each roller is preferably supported within a block having a central aperture carrying ball bearings 26 and 27 in which shaft 25 rotates to carry roller 24 about an axis which intercepts the vertical axis at the center of the rotary assembly. Rollers 28 and 29 are similar to roller 24 and are similarly carried within the frame 13 as in the case of roller 24, and form equally spaced supports each rotating about an axis intersecting the rotary assembly axis at the same point, the shaft axes being preferably horizontal as illustrated.

The structure thus far described supplies a lifting and centering force for the rotary tube assembly inasmuch as the rotary assembly is carried between a plurality of rollers each beveled to cause the ring 23 to center itself for rotation about a vertical axis. Any tendency for the ring 23 to ride up on any side as at rollers 24, 28 or 29 is countered in part by the appropriate selection of the angle of bevel such that the frustro-conical surface 24' of each roller has its apex at the axis of rotation of the ring 23 and sliding friction is not encountered between the surfaces 23' and 24' so long as the rotation occurs about the central axis. The rotary assembly is driven in rotation by means of a ring gear 30 which is secured to collar flange 22 by bolting at suitable intervals therearound to provide uniform support for ring gear 30 concentric with the vertical axis of the feeder tube. Pinion gears 31, 32 and 33 are preferably supplied each directly above one of the rollers 24, 28 or 29, to engage the ring 30 at its downwardly beveled upper face. The bevel angle is selected, as in the case of the ring 23, to have the conic apex at the center of rotation of the tube and the pinion gears meshing closely with the ring gear across the width of the beveled portion thereof. This provides a closely controlled inward thrust action toward the central axis and at the same time a downward thrust at the several points around the periphery of the ring 30. The pinion gear 31 is driven by a shaft as more fully disclosed in the referenced copending application. Pinion gears 32 and 33 are similar, but need not be driven. Each pinion is positioned and supported by a block as at 34 and 35. Block 35 contains a central aperture to receive shaft 37 centrally supporting the pinion 32 and itself supported by the ball bearing races 38 and 39 borne in the aperture of block 35 and secured therein in conventional manner, preferably with sealing flanges to close the bearings from exposure to the atmosphere and to retain oil therein. Each pinion gear is preferably keyed to the bearing shaft as at 41.

Rings 23 and 30 are rigidly secured together by bolting to the flange 22 thereby to provide paired frustro-conical bearing surfaces symmetrical about the axis of rotation and each inclined to circular junction with a plane perpendicular to the axis of rotation of the tube. Rings 23 and 30 thus secured effectively comprise a rigid structure forming as seen in vertical section at each side an isosceles triangle symmetrical about the horizontal plane of intersection of the beveled surfaces, if extended. Each supporting roller and its corresponding pinion comprises a pair of corresponding mating surfaces of support above and below the assembly comprising rings 23, 30 and flange 22 whereby the rings are accurately confined with respect to both the radial and vertical direction from the axis of rotation and vertically confined precisely between a pair of conical rollers 24 and 32 at each of the three or more positions of support and centering.

It will now be apparent that a much stronger and more durable structure has been provided for the support of the rotary tube assembly than is available by the employment of a thrust bearing underneath the flange 22. The tube 12, when clamped in position by the member 16 to a position coaxial and extending below collar 14, will be rotatable about the central vertical axis common to rings 23 and 30 and these rings may not be upwardly displaced or radially displaced by the large upsetting forces which occasionally may occur in practical service. Centering rollers 51, 52 and 53 are preferably disposed around the outer periphery of the ring 23 at positions between rollers 24, 28 and 29. Rollers 51 and 53 may be mounted on vertical bearing shafts rigidly attached to the frame 13 at positions defining the base of a triangle of which the apex is at shaft 11, in order that the rotating assembly may be laterally positioned with respect to a vertical axis of reference through the post 11. Illustrated at 11' an eccentric device about the shaft 11 is provided to laterally position the rotary mechanism. Rollers 51 and 53 likewise form the base of a generally equilateral triangle of which the apex is at roller 52 adjustable to accurately confine the ring 23 with respect to the position determined by the eccentric 11'. A similar eccentric device 52' provides for adjustment of the spacing of the ring 23 with respect to rollers 51 and 53. In assembling the apparatus eccentric 11' may first be adjusted to an approximate position and then the elements of the rotary assembly hereinbefore described may be assembled within the frame 13 approximately concentric within the upper aperture of that frame. After ring 23 has been secured to the flange 22 in its final position with respect thereto the roller 52 may be adjusted by means of the eccentric 52' to provide a minimum clearance all around ring 23 such that rollers 51, 52 and 53 are in position adjacent to the outer vertical cylindrical surface of the ring 23, but preferably not in contact therewith. The blocks bearing shafts 25 and 37 may be adjusted to confine rings 23 and 30 to smooth rotation therebetween, the vertical positions of the blocks with respect to the frame 13 being adjusted and secured by means of suitable shims underneath the blocks.

Figure 4:
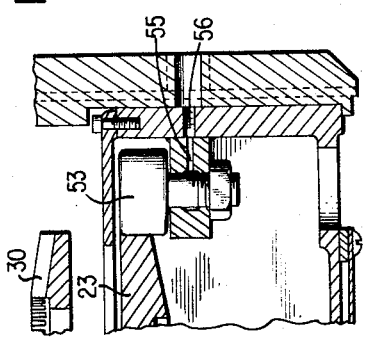
FIG. 4 is a section taken along the line 4—4 of FIG. 1.

An adjustable roller 52 is shown in FIG. 3 with its eccentric device 52' lubricated by an oil supply line as at 57. A detail of a fixed roller such as 53 is illustrated in FIG. 4, together with means for lubricating the shaft thereof as by the ducts 55 and 56 which are connected preferably to the oiling system for the bearing blocks. Each of the rollers 51, 52 and 53 is mounted within the frame portion 13 circumferentially intermediate blocks carrying the rollers supporting the ring 23.

Also illustrated in FIG. 1 is means for holding the clamp member 16 in contact with flange 22 and with the feeder tube 12 wherein a number of ears 58 are formed horizontally outwardly from the cylindrical portion of the member 16 to receive bolts 59 which secure the ears 58 to the flange 22, with suitable adjustment means therebetween as by providing normally a small spacing between ears 58 and flange 22 so that bolts 59 may exert through member 16 a desired degree of pressure against the feeder tube flange to prevent its rotation with respect to the collar 14. Ring gear 30 may be similarly secured to the flange 22 by ears 61 and bolts 62, and the ring 23 may be secured to the flange 22 as by bolts 63 distributed there around.

Each of the bearing blocks in the frame 13 is preferably supplied with oil by way of ducts 64 and 65 leading to the bearings 26 and 27 therein. Blocks 34 and 35 are supplied with oil as by duct 66 and drained by a duct as at 67, which ducts are preferably interconnected for the corresponding blocks of the assembly.

The bearing assemblies according to this invention are provided with cooling air by way of pipes as at 68 through which air is brought into the frame 13 and exhausted by way of a labyrinth as at 69 and 69' to provide a proper operating temperature for the rollers 24, 28 and 29. Shafts 25 may be hollow to receive a portion of the cooling air. Bearings 38 and 39 may be similarly cooled, or may be cooled by supplying an oil mist at 66 with suitable means for removing the liquid oil and the gas separated therefrom.

Since the assembly for the rotating parts of a feeder mechanism is necessarily massive, and is supported for adjustment about a perpendicular axes as at 11 and 15 there is preferably provided a vertical lift mechanism by way of strap 71 which is preferably secured at two like positions oppositely disposed with respect to the pinion 31 through which the mechanism is driven in rotation. A suitable support from the furnace structure may be provided having a downwardly extending shaft 72 which engages the strap 71, and the shaft 72 may be supported by means of a pivot and counterweight to provide the desired degree of lift and vertical positioning of the frame 10 and the mechanism supported thereby about shaft 15, as an adjustment of the vertical position of tube 12 in the feeder. Lateral adjustment in one direction is by way of rotation about shaft 11 and by eccentric 11' for motion perpendicular thereto fixing the position of rollers 51 and 53 against which ring 23 is positioned by eccentric 52'.

While the invention is described in detail to illustrate a preferred mode of operation various mechanical expedients may be substituted within the scope of the appended claims without departing from the invention disclosed.

What is claimed is:

1. In a rotary feeder tube assembly adapted for rotation about a vertical axis in the forehearth of a glass furnace the improvement in positioning and drive means which comprises
    a feeder tube member extending downwardly into said forehearth,
    a ring bearing member concentrically secured to said tube and having a frustro-conical bearing surface symmetrical about an axis which coincides with the axis of said tube,
    beveled ring gear means for driving said tube secured to said ring member in symmetrical relation to said axis and having a gear face sloped oppositely to said conical surface,
    means for applying vertical thrust against said ring bearing means including plural frustro-conical roller members mounted on fixed horizontal axes intersecting at said tube axis at angular separations to provide balancing of radial forces exerted through said conical surface toward said axis for confining motion of said tube thereabout,
    plural beveled pinion gears mounted for rotation about fixed horizontal axes intersecting said tube axis at angular separations to provide balancing of radial forces exerted against said beveled ring gear being positioned to oppose said vertical thrust exerted by said roller members, and
    means driving at least one of said pinion gears to provide rotation of said tube about said tube axis.

2. In apparatus according to claim 1 anti-friction bearing means positioned exteriorly of said tube for supporting said pinion gears and said roller members for rotation about their respective axes and means supplying cooling fluid to said anti-friction bearing means.

3. A rotary glass feeder tube mechanism adapted to symmetrically support and drive said tube about a central axis, comprising beveled ring gear means secured to said tube to face outwardly from said axis and axially in one direction therealong,
beveled multiple pinion gears mounted at fixed locations about the axis for rotation in meshed relation to said gear means and having axes of rotation separately disposed at mutual separations to provide a balancing of lateral thrust in a first plane perpendicular to said axis,
beveled ring means forming a base for said ring gears means the beveled portion facing outwardly from said axis and toward a direction therealong opposite said one direction,
multiple beveled fixed axis roller means arranged in bearing relation to said ring means and having axes of rotation at separations to provide a balancing of lateral thrust against the ring means in a plane parallel to said first plane, whereby said ring and ring gear means is radially and longitudinally confined between said pinion gears and said roller means, and
means driving at least one of said pinion gears.

4. A mechanism according to claim 3 further including a labyrinth passage means surrounding portions of said ring means for receipt of coolant, and means supplying coolant to said passage means and exhausting the same outwardly beyond said mechanism.

5. A glass feeder tube support and rotating mechanism, comprising
    beveled thrust bearing means disposed for support of said tube against motion in one axial direction, said means including fixed axis tapered rollers engaging a beveled ring concentrically secured to said tube,
    beveled ring gear means secured to said bearing means facing oppositely to said direction and outwardly at an angle less than 90° from the axis of said tube,
    beveled multiple pinion gears supported at fixed radial and rotational positions in meshed relation to said gear means and having axes of rotation symmetrically disposed in a plane perpendicular to said direction and substantially parallel to the axes of said rollers,
    means for adjustably holding said pinion gears in axial thrust opposite to the axial thrust of said bearing means for preventing radial and longitudinal motion of said tube, and
    means for driving at least one of said pinion gears about one said axis perpendicular to said direction.

6. A mechanism according to claim 5, said ring and said ring gear being oppositely beveled and of substantially like radius, whereby said rollers and said pinion gears provide therebetween combined radial and axial wedging force to retain said tube aligned with a rotary axis at a fixed position therealong.

References Cited

UNITED STATES PATENTS 1,843,248  2/1932  Soubier _____ 65—331
2,115,279  4/1938  Pennington _____ 74—417

FOREIGN PATENTS 400,865  11/1933  Great Britain.

DONALL H. SYLVESTER, *Primary Examiner.*

D. C. CRUPAIN, A. D. KELLOGG,
*Assistant Examiners.*